Sept. 5, 1950            A. J. KERCHER            2,521,171

ELECTRIC LOAD REGULATOR

Filed June 15, 1948                              3 Sheets-Sheet 1

Arthur J. Kercher,
INVENTOR.

BY John Flam
ATTORNEY

Arthur J. Kercher,
INVENTOR.

BY John Flam
ATTORNEY

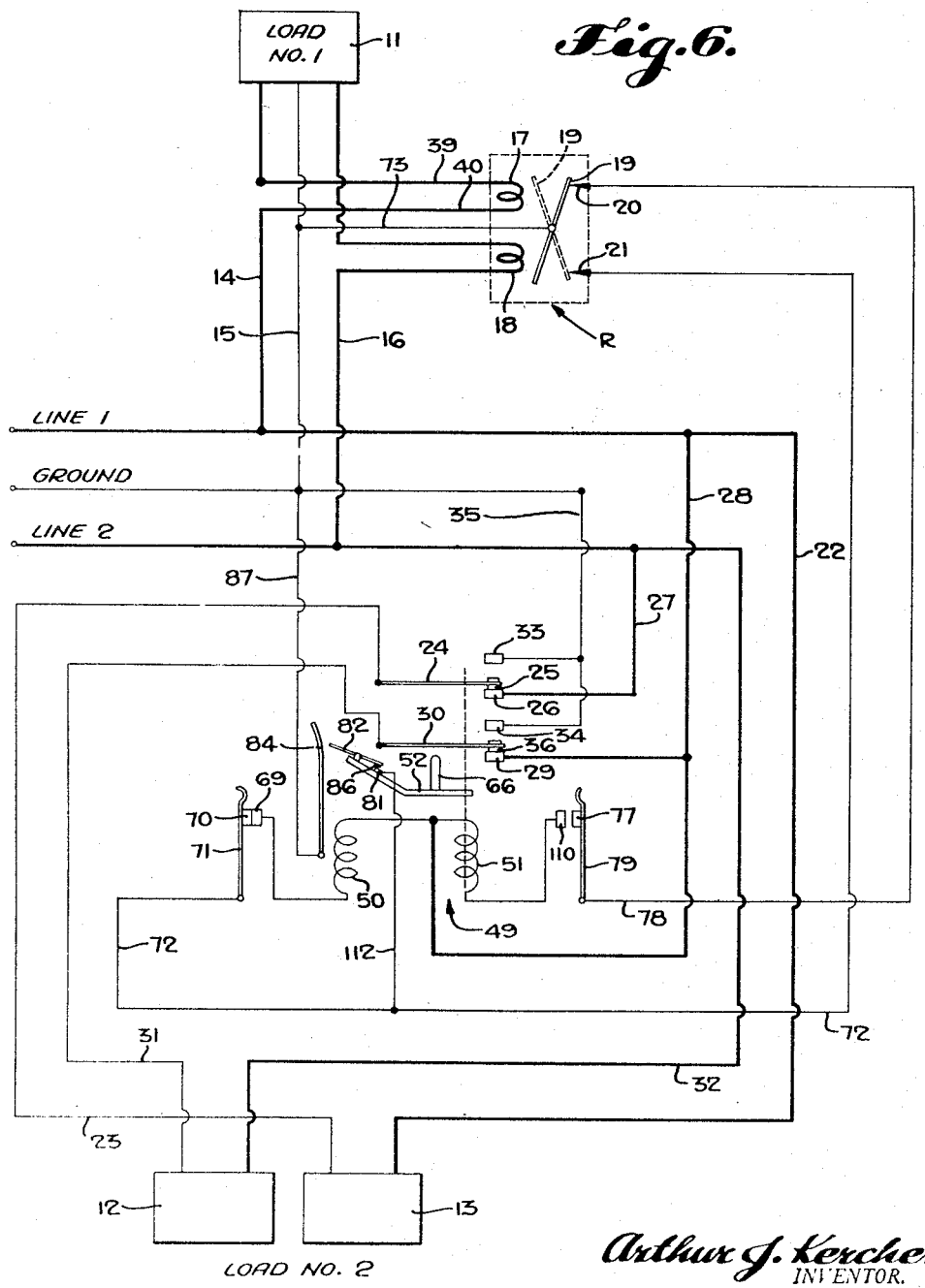

Patented Sept. 5, 1950

2,521,171

UNITED STATES PATENT OFFICE 2,521,171

ELECTRIC LOAD REGULATOR

Arthur J. Kercher, Berkeley, Calif., assignor of one-half to W. Wesley Hicks, San Francisco, Calif.

Application June 15, 1948, Serial No. 33,082

10 Claims. (Cl. 171—97)

This invention relates to the regulation of electric power loads.

There are many electric installations furnishing power for the operation of the usual household needs, such as electric lights, electric ranges, and electric water heaters. In addition, infrequent power consumption is required for household appliances, such as ironing and washing machines, fans, and refrigerators.

A persistent problem encountered in such installations is that the load varies between wide limits—from a very light load in the daytime when no cooking is done and hot water is little used, to a very heavy load at evening when the electric range and water heater are in use. This condition is still further aggravated when electric room heaters provide a part of the load.

It is one of the objects of this invention to make it possible to reduce part of the load without serious inconvenience to the user. More particularly, it is an object of this invention to reduce the space heater load when the load demand for the remainder of the installation is apt to be heavy.

Since the period when intensive space heating is required is generally not coincident with cooking, especially in mild climates such as on the Pacific coast, this temporary reduction in space heating is easily tolerated.

Not only is the load factor much improved in this manner, but power is conserved. In periods of power shortages, this conservation is of considerable importance.

In order to reduce the space heating load in accordance with this invention, the electromotive force supplying the space heaters is reduced. This can be effectively done, especially when a three-wire system is used having a neutral or ground wire of intermediate electromotive force with respect to the other two lines. Normally, the space heating equipment is supplied from the two leads having a maximum electromotive force between them. When the load for the rest of the system is heavy, the space heaters are connected between the neutral conductor and one of the other leads. With 240 volt three-wire systems, the reduced voltage is 120, thereby reducing the space heating load to one-fourth. It is not feasible to reduce the voltage applied to the remainder of the load, such as lighting or cooking; therefore, the invention contemplates reducing the load where it may best be tolerated, as for space heating.

It is accordingly another object of this invention to make it possible to reduce the power consumption of a part of the system without affecting the remainder, when the demand is heavy, by reducing the voltage across the said part.

This load reduction is made automatic, as for example when the current supplied to the remainder of the load reaches a definite high value; or the reduction may be automatically effected by the aid of a time switch, which operates to reduce the load at definite periods of the day or night in which the remainder of the load is likely to be heavy.

It is still another object of this invention to provide a control apparatus that effectively accomplishes these results.

This invention possesses many other advantages, and has other objects which may be made more clearly apparent from a consideration of several forms in which it may be embodied. Such forms are shown in the drawings accompanying and forming part of the present specification. These forms will now be described in detail, illustrating the general principles of the invention; but it is to be noted that such detailed description is not to be taken in a limiting sense, since the scope of the invetnion is best defined by the appended claims.

Referring to the drawings:

Fig. 6 is a wiring diagram illustrating the manner in which the apparatus can be utilized in a system.

Figure 1:
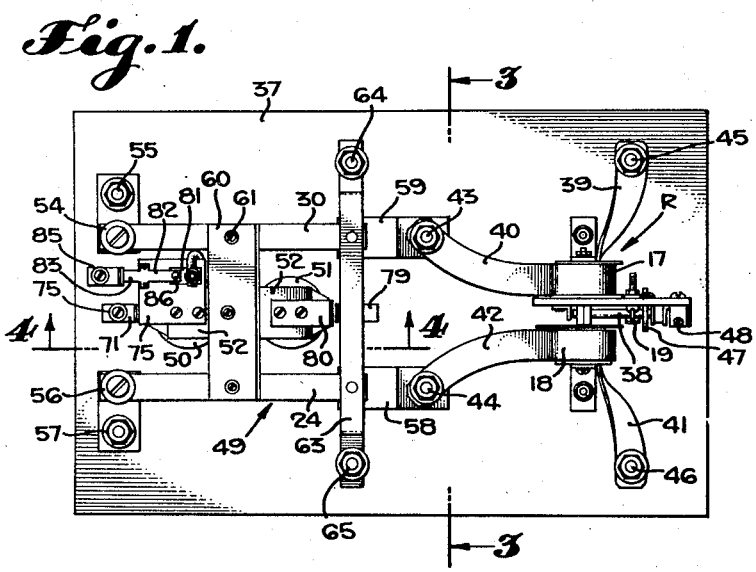
Figure 1 is a top plan view of an apparatus incorporating the invention.

As shown most clearly in Fig. 6, a three-wire system is illustrated. In this system line 1 and line 2, as well as the ground connection, are intended to be supplied from a commercial source of electrical energy, such as a 240 volt system. The electromotive force between the lines 1 and 2 may, for example, be 240 volts and the potential difference between either line 1 or 2 and the ground connection is one-half of that, or 120 volts.

Load No. 1, shown by rectangle 11, may comprise, in the usual household installation, electricity consuming devices, such as a range, lights, water heater, refrigerator, etc. Another load, shown by the two rectangles 12 and 13, may comprise room heater loads. No attempt is made to illustrate the various circuit controlling devices for energizing at will any parts of these loads, since they may be a part of the system diagrammatically illustrated by the rectangles.

Load No. 1 is shown as supplied through the conductors 14, 15 and 16 from the three lines of the system. In the outside lines 14 and 16 are included current coils 17 and 18. These current coils, together with a contact arm 19 and contact points 20 and 21, form a current relay R responding to the combined load furnished to load 1. While the load is below a predetermined value, the contact arm 19 is urged, as by a light spring, to the full-line position shown in the wiring diagram. Under such circumstances full voltage across lines 1 and 2 may be supplied to operate load No. 2.

Thus, for example, that portion of load No. 2 which is indicated by rectangle 13 is supplied from line 1, through a connection 22 to load 13, a connection 23, a rigid switch arm 24, contact 25 carried by the arm 24, a stationary contact 26, and connection 27 to line 2.

Similarly, that portion of load No. 2 represented by rectangle 12 may be supplied from line 2 through connection 32, the load 12, connection 31, rigid switch arm 30, contact 36 on arm 30, stationary contact 29, to line 1.

When the demand of load No. 1 reaches a predetermined value, current coils 17 and 18 in combination move the contact arms 19 toward the dotted line position. This contact arm leaves contact 20 and engages contact 21. By apparatus to be hereinafter described, this change in connections causes the switch arms 24 and 30 to make connection with the stationary contacts 33 and 34.

Since both of these connections 33 and 34 are connected to the ground lead by connection 35, load No. 2 is supplied with half of the voltage between lines 1 and 2, and the load is thereby reduced to twenty-five per cent.

The circuit for that portion of the load represented by rectangle 13 can be traced from line 1 through connection 22, the load 13, connection 23, switch arm 24, contacts 25 and 33, and connection 35 to ground. Similarly, the circuit for that portion of the load corresponding to rectangle 12 can be traced from line 2, connection 32, load 12, connection 31, arm 30, contacts 36 and 34, and connection 35 to ground.

Figure 2:
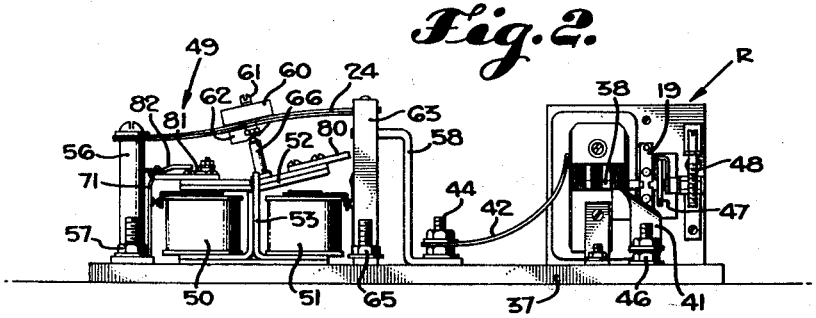
Fig. 2 is a side view thereof.
Figure 3:
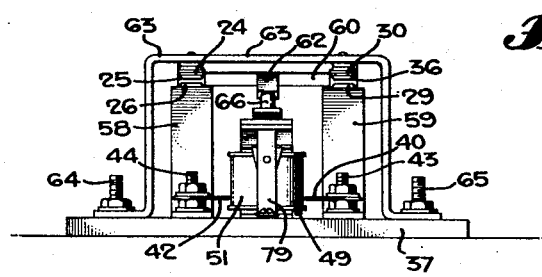
Fig. 3 is a sectional view, taken along a plane corresponding to line 3—3 of Fig. 1.

In Figs. 1 and 2, the current relay R is shown as mounted on a base 37 made from insulation material. Contact arm 19 is shown as mounted on a rotatable shaft 38 which is connected to a rotor influenced by the coils 17 and 18. Connections 39 and 40 for coil 17 are attached to the posts 45 and 43, mounted on base 37. Similarly, connections 41 and 42 are connected to terminal posts 46 and 44. A light helical spring 47, mounted on shaft 38, serves to urge the arm 19 to the position indicated in full lines in Fig. 6. Adjustment of the current relay can be effected in any conventional manner, as by the aid of a screw 48 which may adjust the force of the spring 47. Since this form of apparatus is well known, further discussion of the mechanical details is unnecessary.

Let us assume that the current through coils 17 and 18 reach a value such as to move the contact arm 19 to the dotted line position. This causes operation of an electromagnetic relay structure 49 to move the arms 24 and 30 to the upper position, and this condition is illustrated in Figs. 1, 2, 3, and 4.

The relay structure 49 has two operating coils 50 and 51 mounted on base 37 and operating upon the tiltable armature 52. This armature 52 is mounted for tilting upon the upright legs 53 forming a part of the magnetic circuit for the relay. These legs are placed contiguously, and one of them may have a horizontal projection to retain the armature 52 on its bearing. The armature 52 can be tilted to the position of Figs. 2 and 4 when coil 50 is energized. Similarly, coil 51 pulls the armature 52 to the position of Fig. 5.

As will be explained hereinafter, these coils 50 and 51 are only momentarily energized when contacts 21 are first engaged, so as to position the armature 52 in either of the two positions.

The relay 49 controls the position of the switch arms 24 and 30. Switch arm 30 is shown as made of copper, with a flexible braided connection 54, and carries the contact 36. Its left-hand end is similarly mounted on a post 54 which is connected to a terminal post 55 by the aid of which the connection 31 may be effected. Arm 24 is entirely similar in structure to arm 30. Its left-hand end is connected by means of a flexible lead to a post 56 mounted on base 37, and connecting to a terminal 57 mounted on base 37. This terminal post is connected to the lead 23. In the free position, the arms 24 and 30 resiliently engage the stationary contacts 26 and 29. These contacts are mounted on conducting brackets 58 and 59, likewise mounted on base 37, and connected to the terminal posts 44 and 43 respectively.

A block 60 of insulation material joins the arms 24 and 30, as by the aid of screws 61. Depending below this block 60, and centrally thereof, is a cam member 62. This cam member is arranged to be operated to urge the arms 24 and 30 to the position illustrated in Fig. 4. In this position the arm contacts 25 and 36 are urged against the stationary contacts 33 and 34. These contacts are mounted upon a metallic support 63, extending over the brackets 58 and 59 and having downwardly extending legs connected to terminal posts 64 and 65. These terminal posts may be mounted upon the base 37, and either one of the two terminals 64 and 65 may be connected to the ground line.

Figure 4:
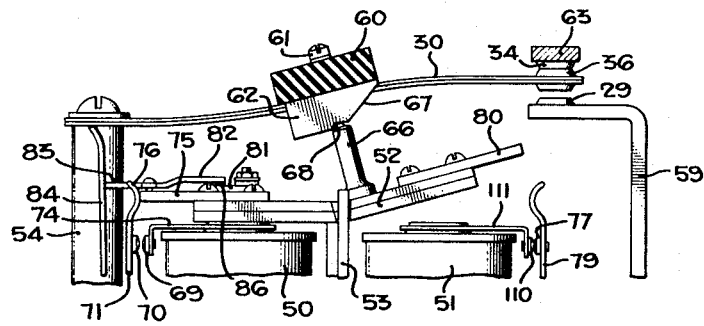
Fig. 4 is an enlarged, fragmentary sectional view, taken along a plane corresponding to line 4—4 of Fig. 1.

In order to urge the cam 62, and thereby the arms 24 and 30, to the position of Figs. 2 and 4, use is made of an actuator 66 mounted on top of the armature 52. This actuator may be in the form of a hollow tube with a spring-urged ball at its upper end adapted to engage the sloping surface 67 of the cam member 62.

Figure 5:
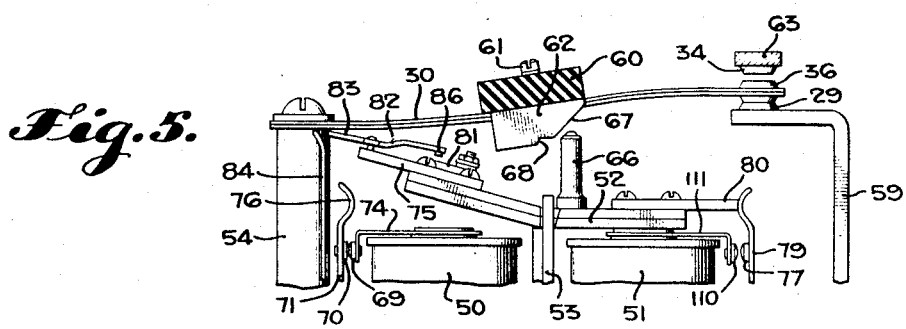
Fig. 5 is a view similar to Fig. 4, but showing an alternate position of the apparatus.

In the free position of Fig. 5, the actuator 66 is out of contact with the sloping surface 67. However, when the armature is tilted to the position of Fig. 4, the actuator 66 urges the cam member 62 upwardly, and the ball is received in a recess 68. This recess 68 serves to hold the apparatus in the position of Fig. 4 even if coil 50 is de-energized. However, when coil 51 is energized, the actuator is moved quite readily to the position of Fig. 5.

Coil 50 or 51 is energized only for a period sufficient to bring the armature to either the position of Fig. 4 or 5. How this is accomplished will now be described.

Let us assume that the arm 19 (Fig. 6) is moved to the dotted line position in response to a large load demand for load No. 1. When this occurs, coil 50 is momentarily energized and the armature 52 is brought to the position of Fig. 4. The circuit for this coil may be traced as follows: from line 1, connection 28, coil 50, contacts 69 and 70, contact arm 71, connection 72, contact 21, contact arm 19, connection 73, to ground.

Contact 69 is mounted on a bracket 74 supported above the coil 50, and the spring arm 71 is connected to a terminal post 75 shown in Fig. 1.

Just as soon as the armature 52 reaches the attracted position of Fig. 4, the spring arm 71 is urged to the left so that contacts 69 and 70 are disconnected and coil 50 is thereby deenergized. Arm 71 is urged to the open position by the insulation bar 75 mounted on the armature 52. The left-hand end of this bar 75 engages the arcuate upper end 76 of spring arm 71 and moves it toward the left.

The armature 52 stays in the position indicated in Fig. 4, the ball restraint operating for this purpose in the recess 68. When this action takes place, load No. 2 is supplied with reduced voltage.

Should the load supplied to load No. 1 be sufficiently reduced, the contact arm 19 returns to the full-line position of Fig. 1. Under such circumstances coil 51 is energized through the following circuit: from line 1, connection 28, coil 51, contacts 110 and 77, connection 78, contact 20, arm 19, and connection 73 to the ground line. Contact 110 is mounted on a bracket 111 similar to bracket 74. Contact 77 is mounted on spring arm 79 that is connected to a terminal post on the base 37.

As before, as soon as the armature 52 reaches the position of Fig. 5, the energizing circuit for coil 51 is opened by engagement of the insulation bar 80 with the upper end of the arm 79. In this position, illustrated in Fig. 5, the load 2 is supplied with a higher voltage, and the apparatus stays in this position until arm 19 moves toward the dotted line position and causes, in a manner hereinbefore discussed, a reduction in the voltage supplied to load No. 2.

The power required to move the armature 52 from the position of Fig. 4 to the position of Fig. 5 is relatively small, as it is merely required that the actuator 66 be moved out of the recess 68. However, movement of the armature 52 to the position of Fig. 4 requires that the spring arms 24 and 30 be flexed upwardly. Since the current relay R has delicately engaging contacts, which may chatter, it is advantageous to provide another set of contacts that parallel the contact between contact 21 and arm 19. This booster contact arrangement is illustrated most clearly in Figs. 1, 4 and 5.

Thus, a contact block 81 is mounted on top of the bar 75. Cooperating with this contact block is a contact 86 mounted on a tiltable arm 82 which is tiltably mounted near the left-hand edge of the bar 75. This arm 82 has a left-hand extension 83. This left-hand extension 83 is in the path of a spring arm 84 that is mounted on the base 37 and connected to a terminal post 85.

In the low load position of Fig. 5, contact 86 may be out of engagement with the contact bar 81. In this position, of course, the coil 50 is deenergized because arm 19 is out of engagement with contact 21. However, as soon as arm 19 swings to the dotted line position of Fig. 6, coil 50 is energized, and the left-hand end of arm 82 engages the spring arm 84. This engagement causes the arm 82 to rock in a clockwise direction and to bring the contact 86 into engagement with the bar 81. When this engagement occurs, the contact between arm 19 and contact 21 is paralleled, and the circuit for coil 50 is established even if contact arm 19 may vibrate in and out of contact. Under such circumstances, the circuit for coil 50 is established as follows: from line 1, connection 28, coil 50, contacts 69 and 70, arm 71, connection 112, contact bar 81, contact 86, arm 82, arm 84, and connection 87, to the ground line.

The mode of operation of the system may now be briefly summarized by the aid of Fig. 6. Normally, while demand for load 1 is below a predetermined value, the connections are established as illustrated in the full lines in the diagram. Coil 51 has been momentarily energized through contacts 110 and 77 and the apparatus is in the position of Fig. 5.

Upon a predetermined load being supplied to load No. 1, contact arm 19 swings to the dotted line position. A circuit is now established for coil 50 and shortly thereafter contact is established between contact 86 and contact bar 81. The switch arms 24 and 30 move to the position of Fig. 4, causing a reduction in the load supplied to load No. 2. The circuit for coil 50 is then interrupted, the contacts 69 and 70 being separated.

In the form just discussed, the switching from high voltage to low voltage for load No. 2 is effected by current relay R. However, this switching can be made to respond to a time switch mechanism, so that, during periods of heavy load, the low voltage can be connected to load No. 2.

Figure 7:
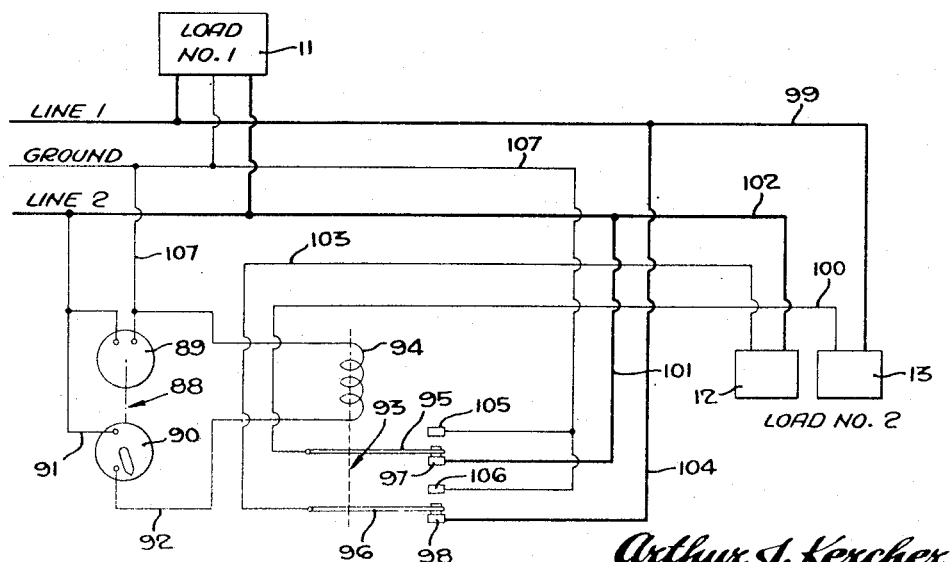
Fig. 7 is a similar wiring diagram of a modified form of the invention.

Such an arrangement is illustrated diagrammatically in Fig. 7. In this connection, load No. 1 represented by rectangle 11, is shown as supplied from the three-wire system. A time switch mechanism 88 is illustrated, including a constant speed motor 89 supplied from line 2 to ground. This motor operates the time switch 90 which causes a connection to be made between lead 91 and lead 92 only during certain periods of the day.

The switching from high to low voltage is accomplished by the aid of an electromagnetic switch mechanism 93 having a coil 94 and the two switch arms 95 and 96. These switch arms, in the normal position shown in the figure, are in contact with the stationary contacts 97 and 98. Under such circumstances, the circuit for that portion of the load represented by rectangle 13 can be traced as follows: from line 1, connection 99, load 13, connection 100, arm 95, contact 97, and connection 101 to line 2. The circuit for load 12 can be traced from line 2, connection 102, load 12, connection 103, arm 96, contact 98, and connection 104, to line 1.

When the time switch 90 is in operation, coil 94 of the relay is energized for moving arms 95 and 96 into engagement respectively with stationary contacts 105 and 106. The coil 94 is energized from ground connection 107, coil 94, connection 92, switch 90, and connection 91 to line 2.

Arms 95 and 96 are now in engagement respectively with contacts 105 and 106. Under such circumstances load 13 is supplied as follows: line 1, connection 99, load 13, connection 100, arm 95, contact 105, connection 107 to ground. Similarly, the circuit for load 12 can be traced as follows: line 2, connection 102, load 12, connection 103, arm 96, contact 106 and connection 107 to ground. This corresponds to the low voltage connection.

The switch 90 thus controls the periods during which low voltage is utilized to supply load 2.

The inventor claims:

1. In a load regulating system for a three-wire source in which a low voltage and a high voltage for supplying electrical energy consuming loads are available: means for supplying a first load from the system; means for normally supplying a second load from the system with the high voltage; and means for switching the second load to the low voltage in response to an increase of the first load to a predetermined value.

2. In a load regulating system for a three-wire source in which a low voltage and a high voltage for supplying two electrical energy consuming loads are available: means for supplying a first load from the system; a switch for connecting the second of said loads either to the high voltage or to the low voltage; a member for operating the switch and having two positions corresponding respectively to the low and high voltage connections; electromagnets respectively for moving the member to either position; and means responsive to a large value of the first load for operating that electromagnet which causes the switch to assume the low voltage position, and responsive to a reduced value of the first load to operate that electromagnet which causes the switch to assume the high voltage position.

3. In a load regulating system for a three-wire source in which a low voltage and a high voltage for supplying two electrical energy consuming loads are available: means for supplying a first load from the system; a current relay operating in response to the current supplied to the first load; and means controlled by said relay for switching the second of said loads either to the low voltage or the high voltage.

4. In a load regulating system for a three-wire source in which a low voltage and a high voltage for supplying two electrical energy consuming loads are available: means for supplying a first load from the system; a current relay having front and back contacts and operating in response to the current supplied to the first load; a switch mechanism for connecting the second of said loads either to the low voltage or the high voltage, and controlled by said relay; an operating member for the switch having two positions corresponding to a high voltage position and to a low voltage position of the switch; electromagnets respectively for moving said member to either position; a control circuit operated by the front contacts of the relay for energizing that electromagnet that moves said member to the low voltage position, and including contacts opened by movement of the member to low voltage position; and a corresponding control circuit for the other electromagnet operated by the back contacts of the relay for energizing the other electromagnet and including contacts opened by movement of the member to high voltage position.

5. The combination as set forth in claim 4, with means for releasably latching the member in low voltage position, including a cam carried by the switch and a detent carried by the member and engaging the cam.

6. The combination as set forth in claim 4, with a pair of contacts paralleling the front contacts of the relay; and means for causing the contacts to engage upon an initial movement of the member to low voltages position.

7. In a control apparatus: a pivoted armature; a pair of electromagnets for moving the armature in opposite directions about its pivot; a resilient switch arm; means carried by the armature to move the switch arm to one position; a pivoted lever carried by the armature; a pair of contacts respectively on the lever and the armature; and means for urging the contacts together, upon movement of the armature in one direction, comprising a resilient arm engaged by one end of the lever.

8. In a load regulating system for a three-wire source in which a low voltage and a high voltage for supplying electrical energy are available: means supplying a first load from the system; a current relay having front and back contacts and operated in response to the current supplied to the first load; a switch mechanism having two stable positions for connecting a second load either to a high or a low voltage; a pair of electromagnet coil means for moving said switch mechanism to either stable position; circuit means operated in response to the positioning of said switch mechanism for alternately conditioning one or the other of said electromagnet coil means; and a circuit for each of said electromagnet coil means, either of which may be energized according to the position of said relay.

9. In a load regulating system for a three-wire source in which a low voltage and a high voltage for supplying electrical energy are available: means supplying a first load from the system; a current relay having front and back contacts and operated in response to the current supplied to the first load; a switch mechanism having two stable positions for connecting a second load either to a high or a low voltage; a pair of electromagnet coil means for moving said switch mechanism to either stable position; circuit means operated in response to the positioning of said switch mechanism for alternately conditioning one or the other of said electromagnet coil means; a circuit for each of said electromagnet coil means, either of which may be energized according to the position of said relay; a pair of contacts paralleling the front contacts of the relay; and means causing the contacts to engage upon an initial movement of the switching mechanism to low voltage position.

10. In a load regulating system for a three-wire source in which a low voltage and a high voltage for supplying electrical energy are available: means for supplying a first load from the system; means for normally supplying a second load from the system with the high voltage; electromagnetically operated switch means for switching the second load to the low voltage; and a circuit for energizing said electromagnet including an armature adapted to close said circuit in response to an increase of the first load to a predetermined value.

ARTHUR J. KERCHER.

REFERENCES CITED

The following references are of record in the file of this patent:

UNITED STATES PATENTS

| Number | Name | Date |
|---|---|---|
| 514,398 | Wiley | Feb. 6, 1894 |
| 1,281,392 | Kelly | Oct. 15, 1918 |
| 1,743,115 | Clark | Jan. 14, 1930 |
| 1,938,405 | Tamsitt | Dec. 5, 1933 |
| 2,199,639 | Lee | May 7, 1940 |
| 2,388,839 | Fry | Nov. 13, 1945 |